United States Patent
Hayward (10) Patent No.: US 6,565,220 B1
(45) Date of Patent: May 20, 2003

(54) SWIVEL MIRROR ASSEMBLY

(76) Inventor: Roger D. Hayward, P.O. Box 745, Murrieta, CA (US) 92564

( * ) Notice: Subject to any disclaimer, the term of this patent is extended or adjusted under 35 U.S.C. 154(b) by 8 days.

(21) Appl. No.: 09/865,314

(22) Filed: May 25, 2001

(51) Int. Cl.[7] .............................. G02B 5/08; G02B 7/182
(52) U.S. Cl. ...................... 359/872; 359/881; 248/477; 248/480; 248/486
(58) Field of Search ................... 359/850, 854, 359/855, 857, 862, 865, 872, 881; 248/476, 477, 479, 480, 485, 486, 487

(56) References Cited

U.S. PATENT DOCUMENTS

| | | | | |
|---|---|---|---|---|
| 77,263 A | * | 4/1868 | Eastman | |
| 115,898 A | * | 6/1871 | Roberts | 359/881 |
| 381,452 A | * | 4/1888 | Wiederer | 359/854 |
| 500,310 A | * | 6/1893 | Willard | 359/854 |
| 577,204 A | * | 2/1897 | Patten | |
| 833,492 A | * | 10/1906 | Van Horn | |
| 1,088,765 A | | 3/1914 | Booth | |
| 1,110,973 A | * | 9/1914 | Tischler | 359/872 |
| 2,192,159 A | * | 2/1940 | Simjian | 359/881 |
| 2,239,487 A | * | 4/1941 | Fulton | |
| 2,783,015 A | * | 2/1957 | Kampa | |
| 2,969,715 A | * | 1/1961 | Musby | |
| 3,476,464 A | * | 11/1969 | Clark | |
| 3,771,854 A | | 11/1973 | Roark | |
| 3,799,489 A | * | 3/1974 | Goerditz | |
| 4,396,249 A | | 8/1983 | Aisley | |
| 4,775,231 A | | 10/1988 | Granzow et al. | |
| D353,068 S | | 12/1994 | Goldstein | |
| 5,399,008 A | | 3/1995 | Vann | |

* cited by examiner

Primary Examiner—Ricky D. Shafer (57) ABSTRACT

A swivel mirror assembly for providing an infinite number of perspective views by means of pivoting the mirror assembly to various desired positions. The swivel mirror assembly includes a frame assembly which is pivotally coupled to a support surface and a mirror assembly which is pivotally coupled to the frame assembly, whereby allowing the frame to be positioned with respect to the support surface and the mirror assembly positioned with respect to the frame assembly such that an infinite number of perspective views can be achieved. In an embodiment, a second mirror is used to facilitate viewing a rear side of the head.

6 Claims, 7 Drawing Sheets

SWIVEL MIRROR ASSEMBLY

BACKGROUND OF THE INVENTION

1. Field of the Invention

The present invention relates to adjustable mirrors and more particularly pertains to a new swivel mirror assembly for providing an infinite number of perspective views by means of pivoting the mirror assembly to various desired positions.

2. Description of the Prior Art

The use of adjustable mirrors is known in the prior art. More specifically, adjustable mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,771,854; 4,396, 249; 5,399,008; 4,775,231; 1,088,765; and Des. 353,068.

While these devices fulfill their respective, particular objectives and requirements, the aforementioned patents do not disclose a new swivel mirror assembly. The inventive device includes a frame assembly which is pivotally coupled to a support surface and a mirror assembly which is pivotally coupled to the frame assembly, whereby allowing the frame to be positioned with respect to the support surface and the mirror assembly positioned with respect to the frame assembly such that an infinite number of perspective views can be achieved.

In these respects, the swivel mirror assembly according to the present invention substantially departs from the conventional concepts and designs of the prior art, and in so doing provides an apparatus primarily developed for the purpose of providing an infinite number of perspective views by means of pivoting the mirror assembly to various desired positions.

SUMMARY OF THE INVENTION

In view of the foregoing disadvantages inherent in the known types of adjustable mirrors now present in the prior art, the present invention provides a new swivel mirror assembly construction wherein the same can be utilized for providing an infinite number of perspective views by means of pivoting the mirror assembly to various desired positions.

The general purpose of the present invention, which will be described subsequently in greater detail, is to provide a new swivel mirror assembly apparatus and method which has many of the advantages of the adjustable mirrors mentioned heretofore and many novel features that result in a new swivel mirror assembly which is not anticipated, rendered obvious, suggested, or even implied by any of the prior art adjustable mirrors, either alone or in any combination thereof.

To attain this, the present invention generally comprises a frame assembly which is pivotally coupled to a support surface and a mirror assembly which is pivotally coupled to the frame assembly, whereby allowing the frame to be positioned with respect to the support surface and the mirror assembly positioned with respect to the frame assembly such that an infinite number of perspective views can be achieved.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new swivel mirror assembly apparatus and method which has many of the advantages of the adjustable mirrors mentioned heretofore and many novel features that result in a new swivel mirror assembly which is not anticipated, rendered obvious, suggested, or even implied by any of the prior art adjustable mirrors, either alone or in any combination thereof.

It is another object of the present invention to provide a new swivel mirror assembly which may be easily and efficiently manufactured and marketed.

It is a further object of the present invention to provide a new swivel mirror assembly which is of a durable and reliable construction.

An even further object of the present invention is to provide a new swivel mirror assembly which is susceptible of a low cost of manufacture with regard to both materials and labor, and which accordingly is then susceptible of low prices of sale to the consuming public, thereby making such swivel mirror assembly economically available to the buying public.

Still yet another object of the present invention is to provide a new swivel mirror assembly which provides in the apparatuses and methods of the prior art some of the advantages thereof, while simultaneously overcoming some of the disadvantages normally associated therewith.

Still another object of the present invention is to provide a new swivel mirror assembly for providing an infinite number of perspective views by means of pivoting the mirror assembly to various desired positions.

Yet another object of the present invention is to provide a new swivel mirror assembly which includes a frame assembly which is pivotally coupled to a support surface and a mirror assembly which is pivotally coupled to the frame assembly, whereby allowing the frame to be positioned with respect to the support surface and the mirror assembly positioned with respect to the frame assembly such that an infinite number of perspective views can be achieved.

Still yet another object of the present invention is to provide a new swivel mirror assembly that when used in conjunction with a stationary mirror, allows an individual to easily see various additional perspective views of their head and body for styling and such other purposes with both hands left free for such tasks.

Even still another object of the present invention is to provide a new swivel mirror assembly with a simplistic design, making for the ease of installation and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
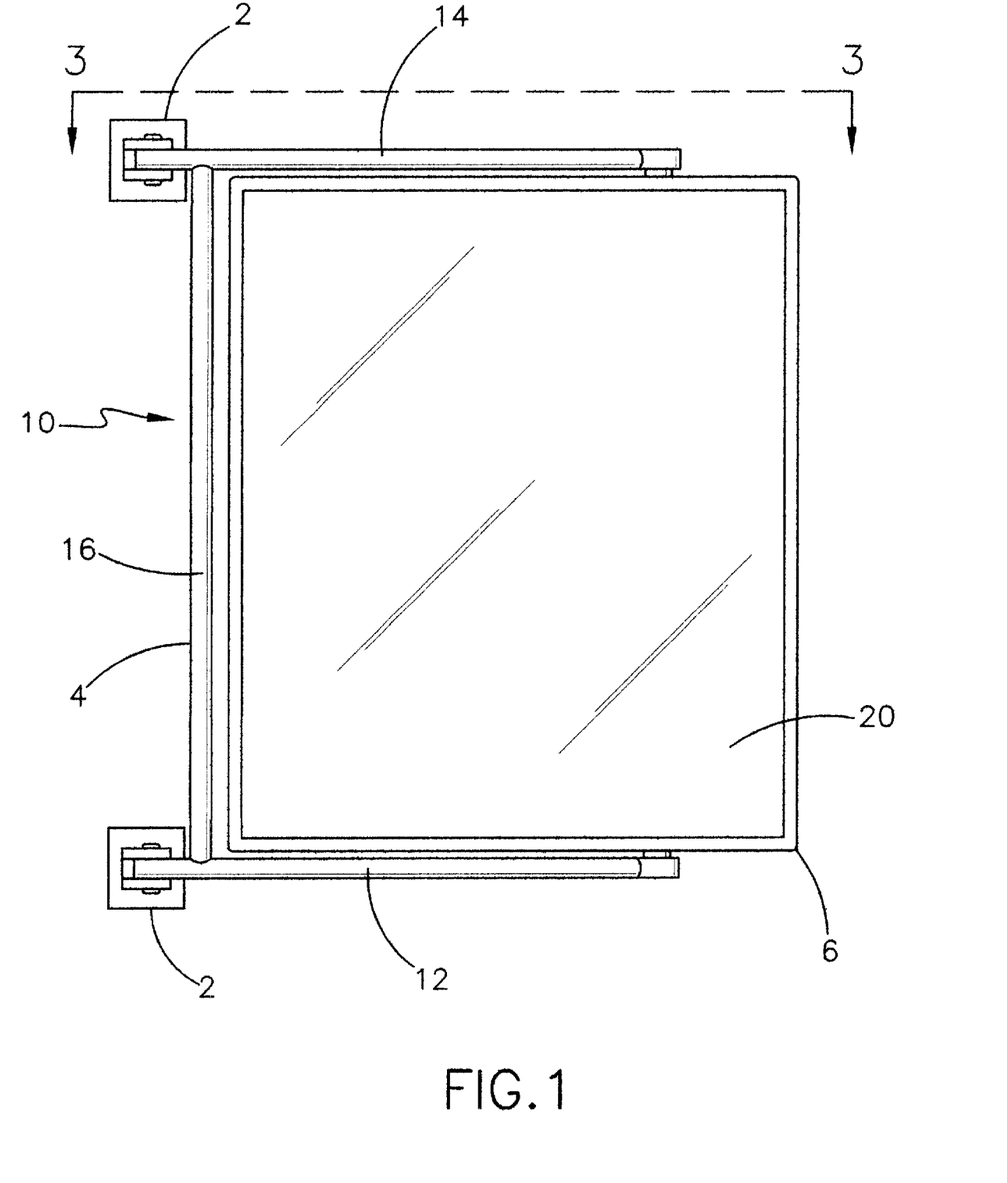
FIG. 1 is a schematic front view of the present invention.
Figure 2:
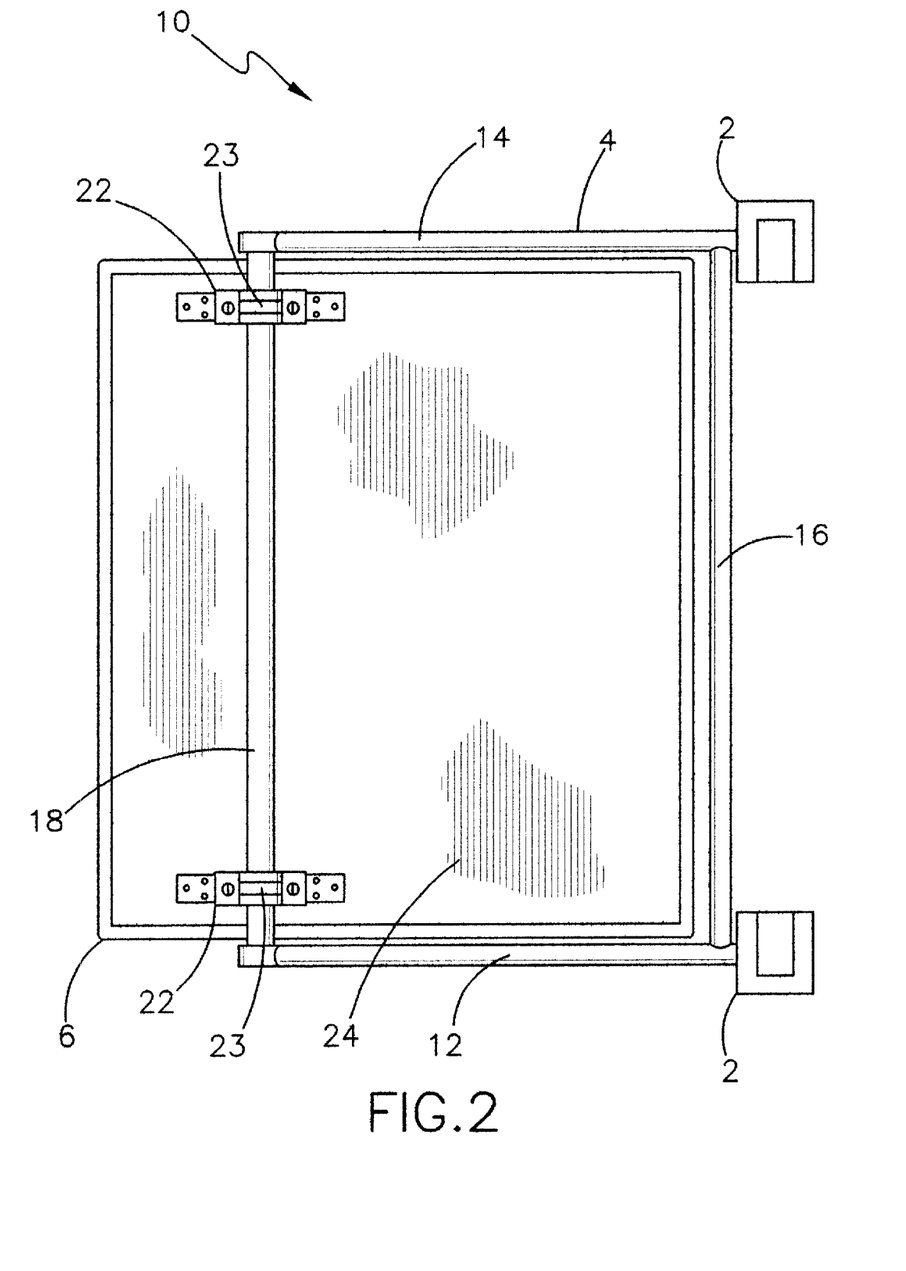
FIG. 2 is a schematic rear view of the present invention.
Figure 3:
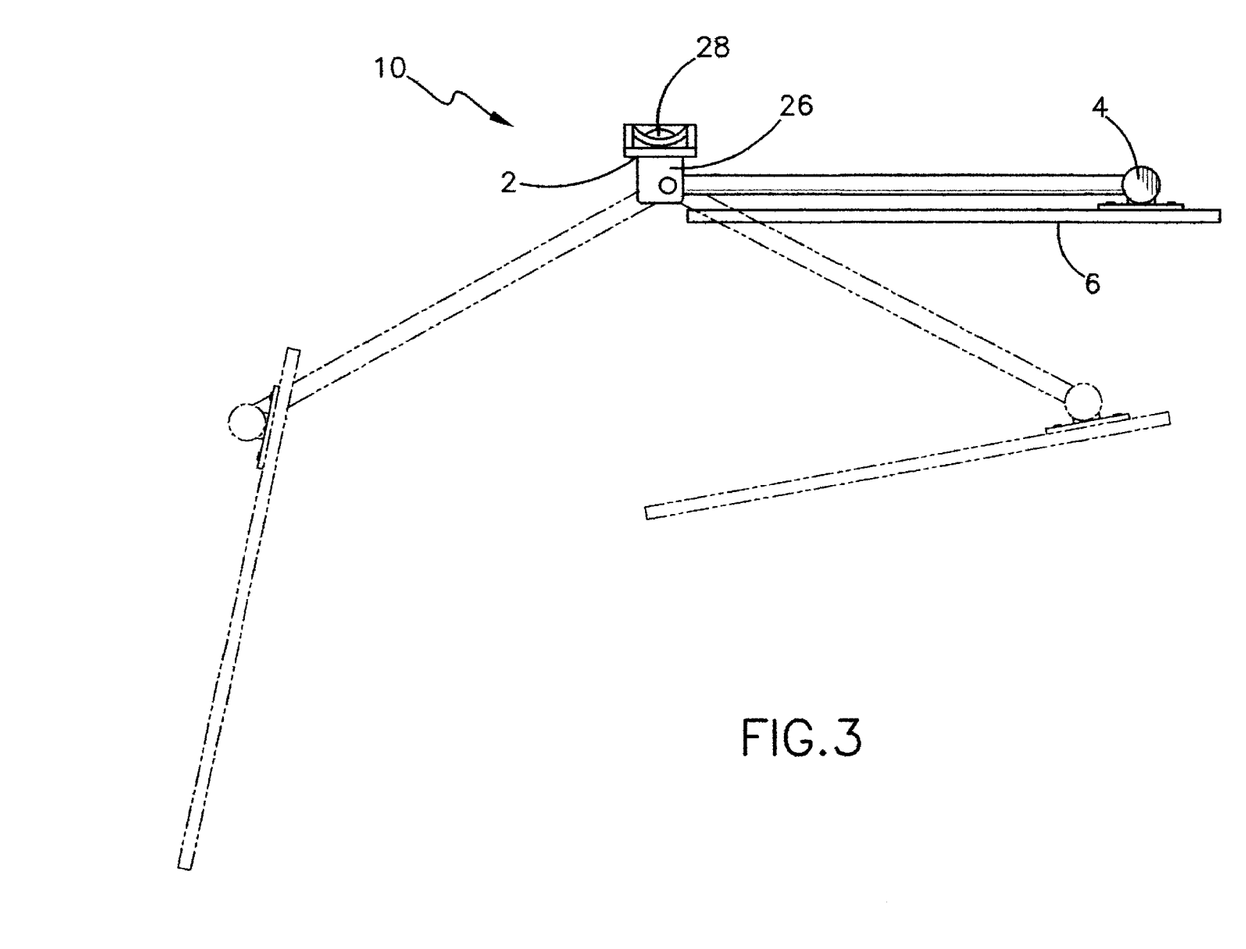
FIG. 3 is a schematic top view of the present invention.
Figure 3A:
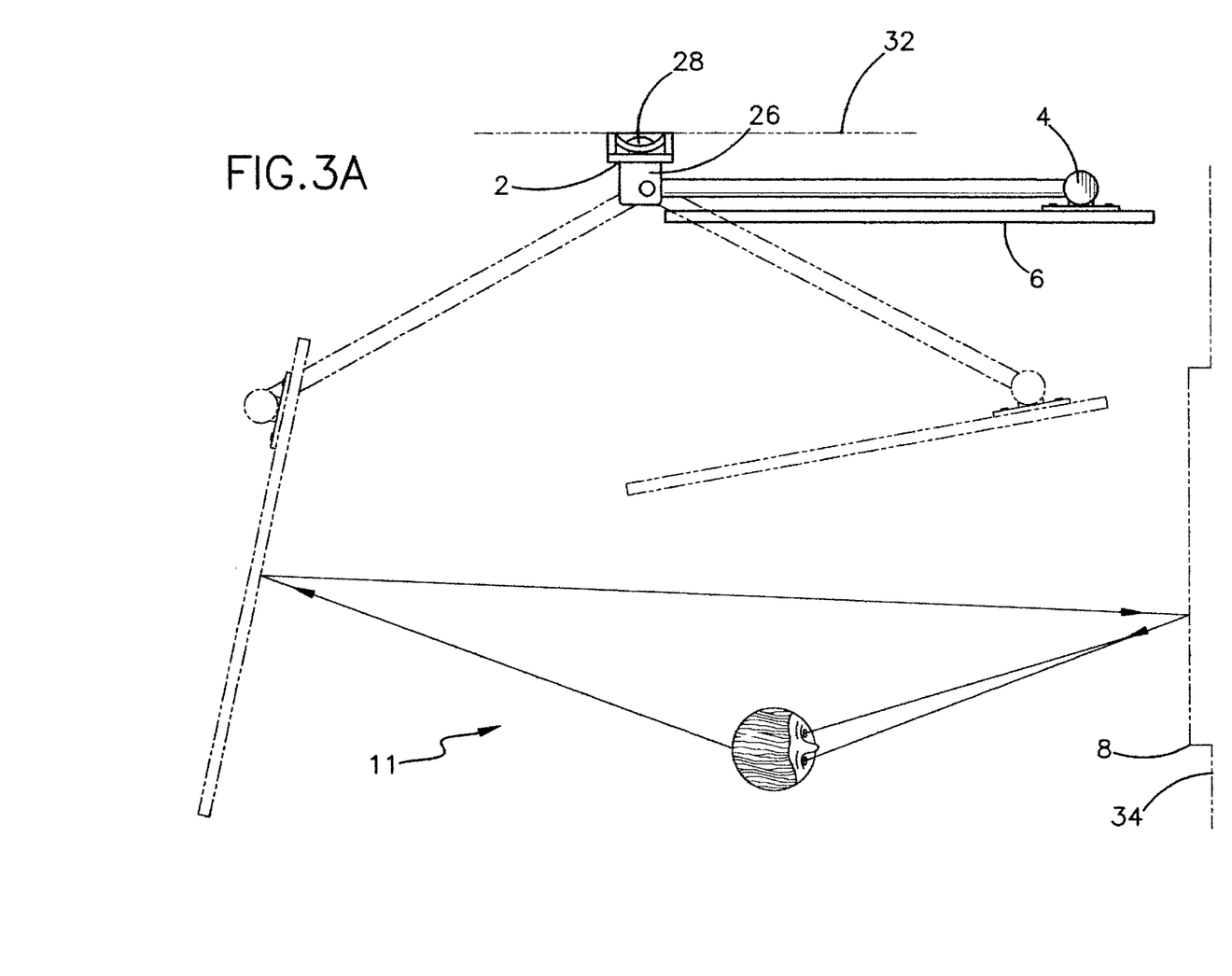
FIG. 3A is a schematic perspective view of the swivel mirror system.
Figure 4A:
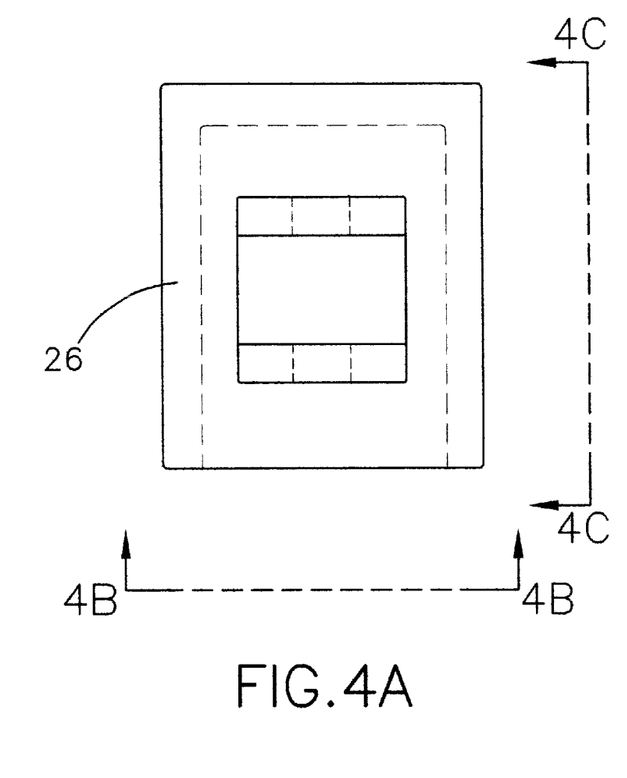
FIG. 4A is a schematic top view of the hinge member.
Figure 4B:
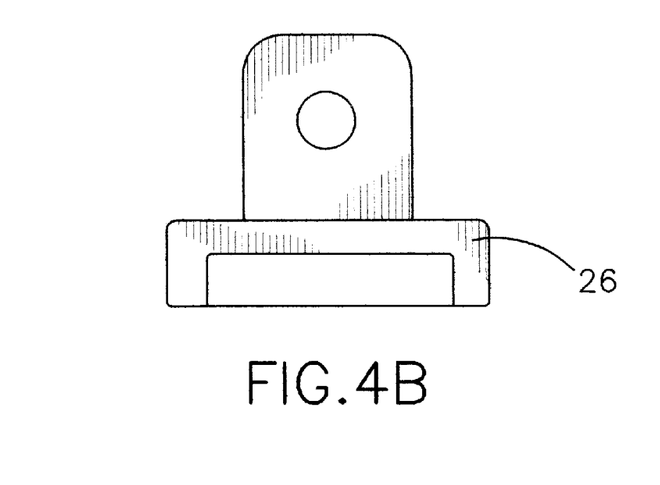
FIG. 4B is a schematic end view of the hinge member.
Figure 4C:
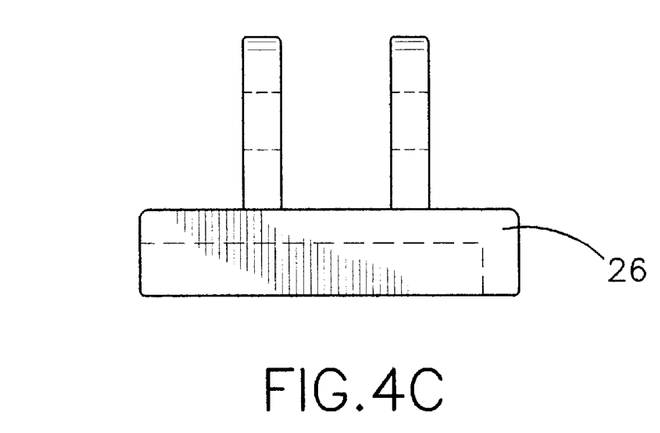
FIG. 4C is a schematic side view of the hinge member.
Figure 5A:
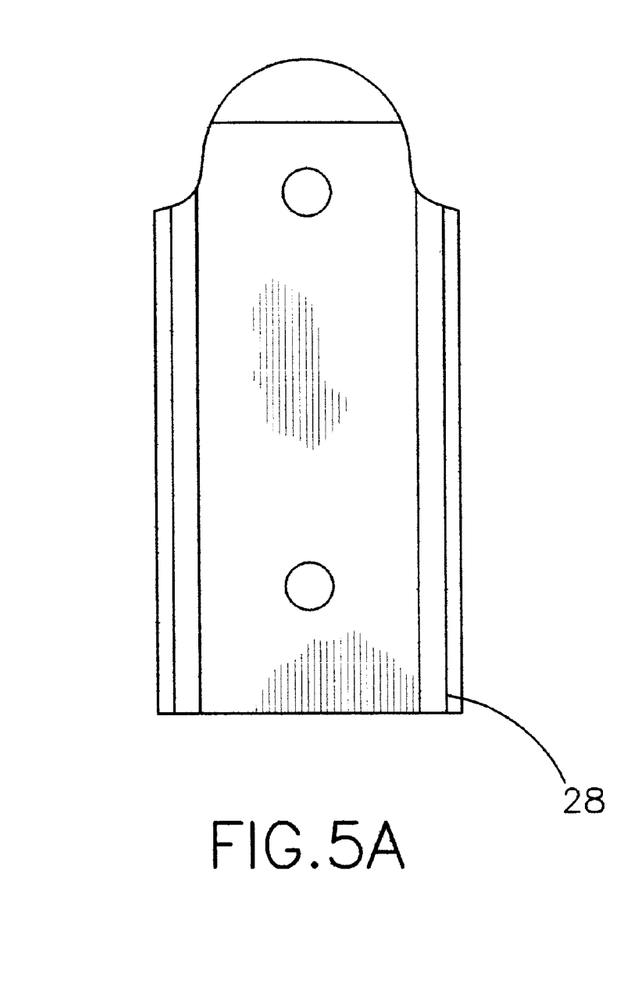
FIG. 5A is a schematic top view of the attachment member.
Figure 5B:
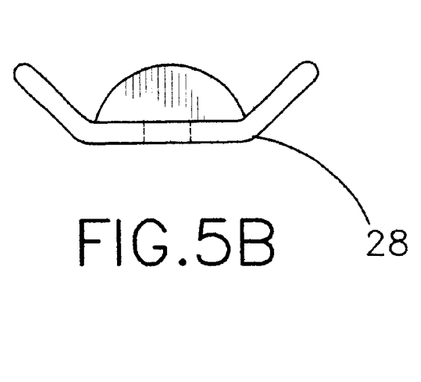
FIG. 5B is a schematic end view of the attachment member.
Figure 5C:
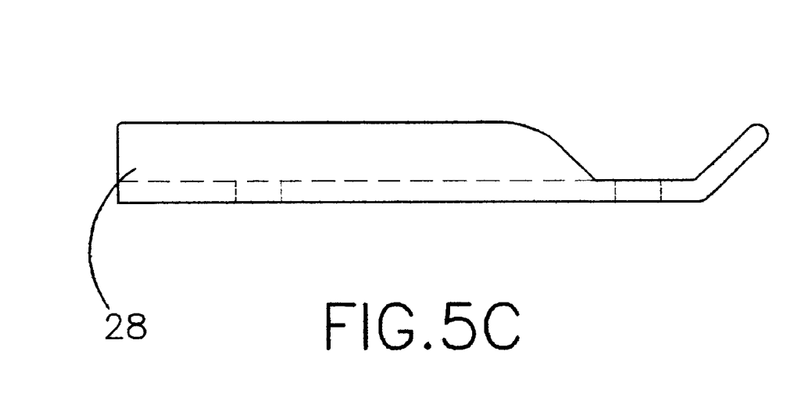
FIG. 5C is a schematic side view of the attachment member.
Figure 6:
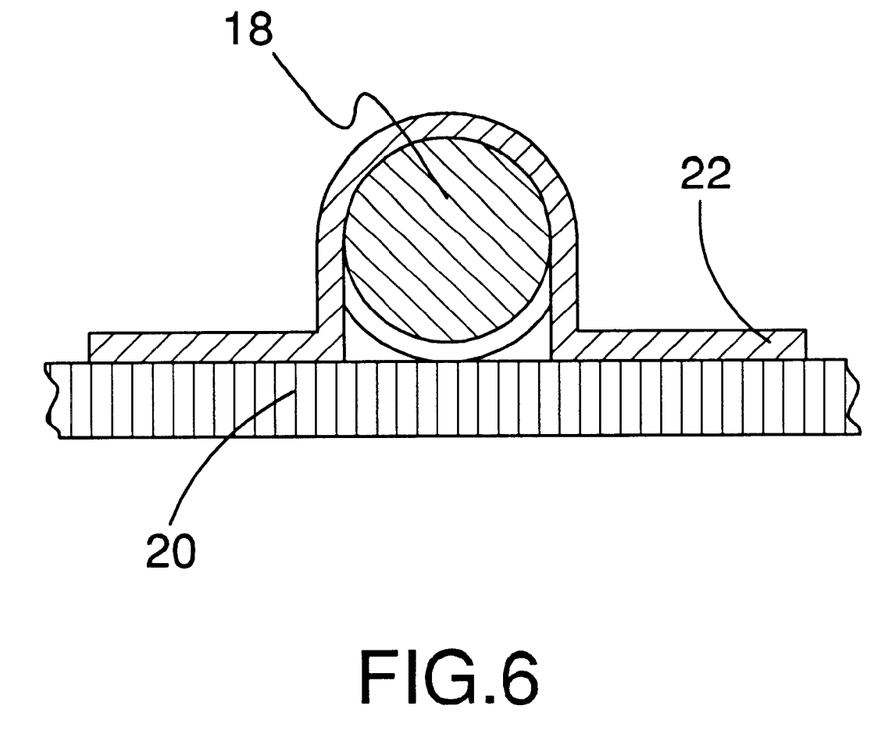
FIG. 6 is a schematic sectional view of a mirror bracket assembly of the present invention.

With reference now to the drawings, and in particular to FIGS. 1 through 5C thereof, a new swivel mirror assembly embodying the principles and concepts of the present invention and generally designated by the reference numeral 10 will be described.

As best illustrated in FIGS. 1 through 5C, the swivel mirror assembly 10 generally comprises a pair of structure connection assemblies 2, the structure connection assemblies 2 being designed for coupling to a support surface. A frame assembly 4 pivotally coupled to the structure connection assemblies 2, and a mirror assembly 6 pivotally coupled to the frame assembly 4.

The frame assembly 4 includes a first frame cross member 12 and a second frame cross member 14. The first and second frame cross members 12,14 each have a proximal end pivotally coupled to an associated one of the pair of structure connection assemblies 2, thereby permitting pivoting of the frame assembly 4.

The frame assembly 4 has an inner frame member 16. The inner frame member 16 is coupled to the first frame cross member 12 and the second frame cross member 14 such that the inner frame member 16 extends between the first and second frame cross members 12,14 proximate the proximal ends of the first and second frame cross members 12,14.

The frame assembly 4 includes an outer frame member 18, the outer frame member 18 is coupled to the first frame cross member 12 and the second frame cross member 14 such that the outer frame member 18 extends between the first and second frame cross members 12,14 proximate the distal ends of the first and second frame cross members 12,14.

Each of the structure connection assemblies 2 comprises an attaching member 28 and a hinge member 26. The attaching member 28 is couplable to the support surface, and the hinge member 26 is couplable to the attaching member 28.

The mirror assembly 6 is pivotally attached to the frame assembly 4 such that the mirror assembly 6 is pivotable relative to the frame assembly 4.

The outer frame member 18 has a circular cross-section taken transverse to a longitudinal axis of the outer frame member 18.

The mirror assembly 6 includes a mirror 20 and a pair of mirror brackets 22 coupled to the rear surface 24 of the mirror 20. The mirror brackets 22 each consist of a pair of outer portions and an arcuate medial portion. The arcuate medial portion is for receiving the outer frame member 18 for permitting rotation of the mirror bracket 22. This facilitates pivoting of the mirror assembly 6 relative to the frame assembly 4.

The outer portions of the mirror brackets 22 have a coupling means for coupling of the mirror brackets 22 to the rear surface 24 of the mirror 20.

The arcuate medial portion of the mirror brackets 22 includes a circumferential band 23 of predetermined width protruding inwardly.

The outer frame member 18 includes a pair of circumferential grooves extending the entire circumference of the outer frame member 18 such that each groove receives the circumferential band 23 of an associated one of the mirror brackets 22. Thus, longitudinal movement of the mirror assembly 6 relative to the frame assembly 4 is prevented when each of the grooves receives the circumferential band 23 of the associated mirror bracket 22.

In an embodiment, a stationary mirror 8 is used together with the previously described swivel mirror assembly 10. Typically, the swivel mirror assembly is coupled to a side support surface 32 and the stationary mirror 8 is coupled to a front support surface 34. Thus, when the swivel mirror assembly 10 is in an extended position behind and beside a user's head, the user can view the rear side of their head using the stationary mirror 8.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A swivel mirror assembly, the swivel mirror assembly comprising:

a pair of structure connection assemblies for coupling to a vertical support surface;

a frame assembly being pivotally coupled to each of said structure connection assemblies, said frame assembly comprising a first cross member, a second cross member, an inner frame member, and an outer frame member; a mirror assembly being pivotally coupled to said frame assembly, said mirror assembly including a mirror member and a plurality of mirror brackets for mounting said outer frame member of said frame assembly to a rear surface of said mirror member;

each of said mirror brackets having an arcuate medial portion for receiving said outer frame member to facilitate pivoting of said mirror member relative to said frame assembly, said outer frame member being mounted to an outer portion of said mirror member such that an axis of rotation of said mirror member is substantially offset from a central longitudinal axis of said mirror member;

wherein pivoting of said mirror member causes an inner portion of said mirror member to extend substantially away from said frame assembly such that said mirror member is positionable behind a user to permit viewing of a back side of a head of the user when used in conjunction with a stationary mirror;

said arcuate medial portion of said mirror brackets including a circumferential band of predetermined width protruding inwardly; and said outer frame member including a pair of circumferential grooves extending the entire circumference of said outer frame member such that each groove receives said circumferential band of an associated one of said mirror brackets whereby longitudinal movement of said mirror assembly relative to said frame assembly is prevented when each of said grooves receives said circumferential band of said associated mirror bracket.

2. The swivel mirror assembly as set forth in claim 1, further comprising:

said first and second frame cross members each having a proximal end being pivotally coupled to an associated one of said structure connection assemblies, wherein said frame assembly is pivotable relative to the support surface when said connection assemblies are mounted on the support surface.

3. The swivel mirror assembly as set forth in claim 2, further comprising:

said inner frame member being coupled to and extending between each of said cross members and being positioned adjacent to said proximal ends of said first and second frame cross members.

4. The swivel mirror assembly as set forth in claim 1, further comprising:

said outer frame member being coupled to and extending between each of said cross members and being positioned adjacent to distal ends of said first and second frame cross members; and said outer frame member having a circular cross-section taken transverse to a longitudinal axis of said outer frame member.

5. The swivel mirror assembly as set forth in claim 1, further comprising:

each of said structure connection assemblies comprising an attaching member and a hinge member, each of said attaching members being couplable to the support surface, each of said hinge members having a channel extending partially therein for receiving said attaching members such that said hinge members are releasably couplable to the support surface when said attaching members are coupled to the support surface such that said frame assembly is releasably couplable to the support surface.

6. A swivel mirror assembly, the swivel mirror assembly comprising:

a pair of structure connection assemblies for coupling to a vertical support surface;

a frame assembly being pivotally coupled to each of said structure connection assemblies, said frame assembly comprising a first cross member, a second cross member, an inner frame member, and an outer frame member;

a mirror assembly being pivotally coupled to said frame assembly, said mirror assembly including a mirror member and a plurality of mirror brackets for mounting said outer frame member of said frame assembly to a rear surface of said mirror member;

each of said mirror brackets having an arcuate medial portion for receiving said outer frame member to facilitate pivoting of said mirror member relative to said frame assembly, said outer frame member being mounted to an outer portion of said mirror member such that an axis of rotation of said mirror member is substantially offset from a central longitudinal axis of said mirror member; and wherein pivoting of said mirror member causes an inner portion of said mirror member to extend substantially away from said frame assembly such that said mirror member is positionable behind a user to permit viewing of a back side of a head of the user when used in conjunction with a stationary mirror;

said first and second frame cross members each having a proximal end being pivotally coupled to an associated one of said structure connection assemblies, wherein said frame assembly is pivotable relative to the support surface when said connection assemblies are mounted on the support surface;

said inner frame member being coupled to and extending between each of said cross members and being positioned adjacent to said proximal ends of said first and second frame cross members;

said outer frame member being coupled to and extending between each of said cross members and being positioned adjacent to distal ends of said first and second frame cross members;

said outer frame member having a circular cross-section taken transverse to a longitudinal axis of said outer frame member;

each of said structure connection assemblies comprising an attaching member and a hinge member, each of said attaching members being couplable to the support surface, each of said hinge members having a channel extending partially therein for receiving said attaching members such that said hinge members are releasably couplable to the support surface when said attaching members are coupled to the support surface such that said frame assembly is releasably couplable to the support surface;

said arcuate medial portion of said mirror brackets including a circumferential band of predetermined width protruding inwardly; and said outer frame member including a pair of circumferential grooves extending the entire circumference of said outer frame member such that each groove receives said circumferential band of an associated one of said mirror brackets whereby longitudinal movement of said mirror assembly relative to said frame assembly is prevented when each of said grooves receives said circumferential band of said associated mirror bracket.

* * * * *